Nov. 20, 1962      B. BARÉNYI      3,064,747
AIR-GUIDE ARRANGEMENT, ESPECIALLY IN MOTOR VEHICLES
Filed May 11, 1960      2 Sheets-Sheet 1

INVENTOR.
BELA BARÉNYI
BY
ATTORNEYS

INVENTOR.
BELA BARÉNYI

United States Patent Office
3,064,747
Patented Nov. 20, 1962

3,064,747
AIR-GUIDE ARRANGEMENT, ESPECIALLY IN
MOTOR VEHICLES
Béla Barényi, Stuttgart-Vaihingen, Germany, assignor to
Daimler-Benz Aktiengesellschaft, Stuttgart-Unterturkheim, Germany
Filed May 11, 1960, Ser. No. 28,276
Claims priority, application Germany May 27, 1959
3 Claims. (Cl. 180—54)

The present invention relates to an air-guiding system for motor vehicles, and more particularly to a system for the supply and discharge of air including inlet and outlet openings provided in the body of the vehicle.

In the prior art installations known heretofore, which performed essentially similar functions, separate apertures or openings were provided for this purpose in the outer body covering panels of the motor vehicle.

The disadvantages which such apertures in the outer body covering parts or panels of the motor vehicle entail may be summarized briefly as follows: On the one hand, the accommodation of such apertures or openings means, in practice, a reduction of the rigidity of the outer body parts or panels, and on the other, such apertures or openings oftentimes not only disturb the aesthetic appearance of the vehicle, but in particular impair the aerodynamic configuration of the vehicle. In any case, however, special operating steps are necessary in order to provide such apertures or openings in the outer body parts or panels. These apertures or openings are also provided frequently with perforated or screen-like chrome-plated parts which further increases the cost of manufacture of the motor vehicle. It is also oftentimes difficult to impart in this manner to the apertures a cross-section which is sufficient for adequate air guidance, i.e., for a sufficient air-flow, and in many instances the provision of special air channels, ducts or compartments become necessary.

The present invention aims at eliminating the aforementioned shortcomings and disadvantages of the prior art, and essentially consists in realizing the air supply or air discharge by means of gaps which are provided between the vehicle outer body parts or covering panels. Since these gaps will be formed automatically during assembly of the body made from a plurality of individual body parts or panels which are constructed and dimensioned corresponding to the design and purpose of the present invention, the method of obtaining the required air apertures or openings in accordance with the present invention is extremely inexpensive for purposes of obtaining adequate apertures or openings through which the air may flow. Moreover, such gaps have no disturbing effect on the vehicle since they follow the aerodynamic configuration of the vehicle determined by the structural outline of the body. Finally, relatively large and efficient cross-sections for the air guidance may be readily achieved in this manner.

Especially in motor vehicles having a body cross-section closed off by means of an end or terminal wall, the air inlet or discharge may take place through the gap formed between the edges of the engine hood and the edges of the end or terminal wall panel. If the motor vehicle is provided with an engine hood extending over the full width of the vehicle and provided with wall parts preferably bent downwardly along the sides thereof, then the gaps formed between the lateral terminal edges of the hood and the upper edges of the fender may also serve as air inlet or discharge. In that case, the air upon admission into the space between the outer body parts is appropriately guided upwardly at first which is particularly favorable for a separation of dust and water therefrom. If a full-width engine hood, preferably provided with downwardly-bent lateral wall portions, extends up to the door, then the air inlet or discharge may also take place between the adjoining lateral edges of the engine hood and the door. If such an engine hood extends to the front or rear window pane of the passenger space, then the gap between the edge of the engine hood and the front or rear window pane may also be used alternately or additionally as air inlet or discharge.

According to a further feature of the present invention, gaps may also be provided for the air inlet and discharge which are located between the fender edge and the door edge. Instead of such an arrangement, however, the air inlet or discharge may also take place between the fender edge and the lateral edge of the transverse end wall which closes off the vehicle cross-section.

Furthermore, several or even all of the aforementioned gaps may be provided for guiding the fresh and/or used or stale air, and may be dimensioned accordingly.

Accordingly, it is an object of the present invention to provide a ventilation system for a motor vehicle, and more particularly an air guiding system adapted to provide a supply and/or discharge of air, for instance, as required for the operation of the engine which obviates the disadvantages of the prior art constructions.

Another object of the present invention resides in the provision of an air inlet and discharge system assuring adequate supply of air under all operating conditions for proper operation of the vehicle engine notwithstanding its extreme simplicity.

Still another object of the present invention resides in the provision of an air-guide system which assures sufficiently large cross-sectional areas for the flow of air to and from the engine and/or the passenger space without impairing either the aesthetic appearance of the vehicle or the aerodynamic streamlining thereof.

Still another object of the present invention resides in the provision of an air-guide system in which the inlet and discharge openings or apertures are effectively provided in gaps between adjacent body panels whereby the gaps are formed within the area of the normal separation of such body panels.

A further object of the present invention is the provision of an air-guide system for motor vehicles which may be realized in a relatively inexpensive manner without impairing the effectiveness thereof, which requires few extra operating steps in the manufacture and assembly thereof, and which permits the use of relatively large cross-sectional openings to permit a sufficient amount of air flow therethrough.

These and other objects, features and advantages of the present invention will become more obvious from the following description, when taken in connection with the accompanying drawing, which shows, for purposes of illustration only, one embodiment in accordance with the present invention and wherein FIGURE 1 is a schematic perspective view of a motor vehicle provided with gaps for the air-guide system in accordance with the present invention, it being understood that not all of the gaps shown in this figure need necessarily be provided in one and the same vehicle since the number and arrangements thereof may be varied, depending on the particular requirements of the vehicle;

Figure 1:
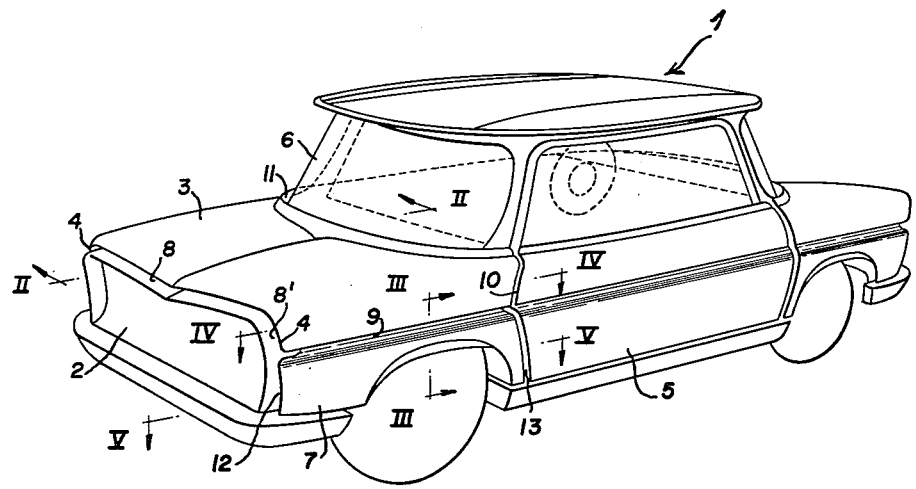

Referring now to the drawing, wherein like reference numerals are used throughout the various views to designate like parts, and more particularly to FIGURE 1, reference numeral 1 generally designates therein a motor vehicle which is provided with an end or terminal wall 2 closing off the vehicle cross-sectional area, for example, along the engine side thereof. The vehicle 1 further includes an engine hood 3 extending over the entire width of the vehicle and provided with downwardly-bent lateral wall parts 4 which in turn extend to within the area of the door 5 and, in the embodiment of FIGURE 1, also up to the rear window pane 6 of the motor vehicle. The fenders 7 adjoin the engine hood 3 laterally of the motor vehicle. The gaps 8, 8', 9, 10, 11, 12 and 13 which automatically result therefrom between the respective panels of the body are particularly clearly visible in the enlarged cross-sectional views of FIGURES 2–5.

In the illustrated embodiment described herein, gaps are provided between all of the aforementioned adjoining body parts or panels, though it is understood that the present invention is not limited thereto but is also applicable to motor vehicles in which only one or several of the gaps shown and described herein are used.

Figures 2, 3:
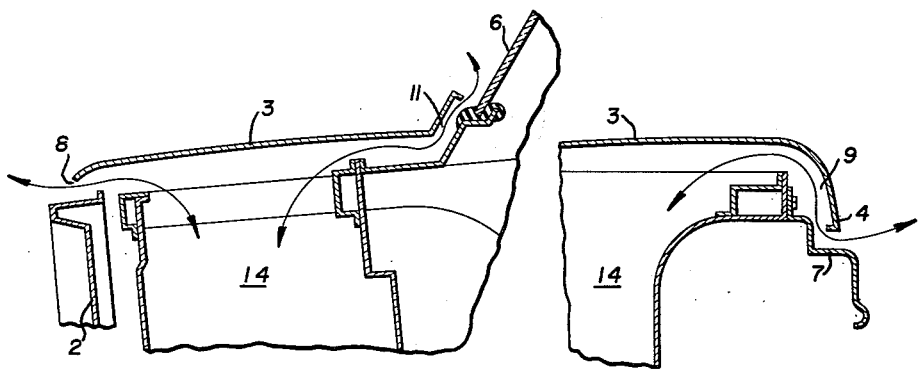
FIGURE 2 is a cross-sectional view, on an enlarged scale, taken along line II—II of FIGURE 1.
FIGURE 3 is a cross-sectional view, on an enlarged scale, taken along line III—III of FIGURE 1.

The gap 8 which is formed between the end wall 2 and the engine hood 3 is illustrated in greater detail in FIGURE 2. The gap 9 formed between the engine hood 3 and the fender 7 laterally adjoins the gap 8. As is clearly visible from FIGURE 3, in the air-guide system according to the present invention which includes laterally downwardly-bent wall parts 4 of the engine hood 3 and in which the air flows through gap 9, the air supplied in such system from the outside to the engine compartment 14 has to flow initially upwardly whereby favorable conditions are created for the separation of dust and water from the air thus supplied.

Figure 4:
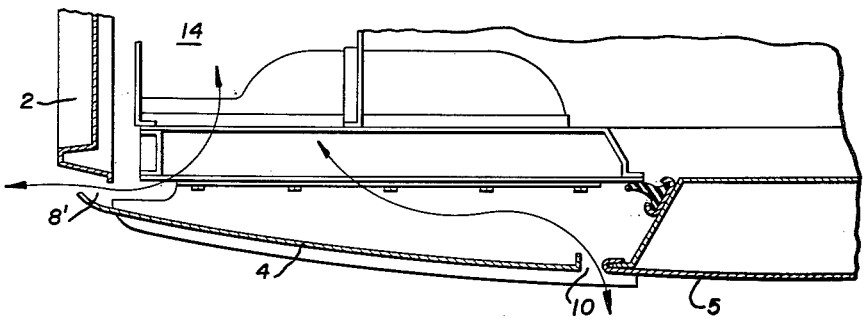
FIGURE 4 is a cross-sectional view, on an enlarged scale, taken along line IV—IV of FIGURE 1.

FIGURE 4 illustrates separately, on an enlarged scale, the gap 10 which is formed between the lateral parts 4 of the engine hood 3 and the door 5. This gap 10 is preferably used for the air guidance in order to protect the passengers against any possible soiling. Additionally, the gap 8' which is formed between the lateral, downwardly-bent parts 4 of the engine hood 3 and the terminal wall 2 is also shown in FIGURE 4.

Continuing the description of the arrangement in accordance with the present invention in essentially the same direction, there is formed another gap 11 which is formed between an engine hood 3 extending up to the window pane 6 and the rear or front window pane 6 or the supporting parts thereof (FIGURE 2). If, in particular, this gap 11 is used for the discharge of air, then the air heated by the engine may be used during the cold weather season for defrosting the window pane 6 which would be particularly advantageous for the windshield of a vehicle having an engine arranged in the front part of the vehicle.

Figure 5:
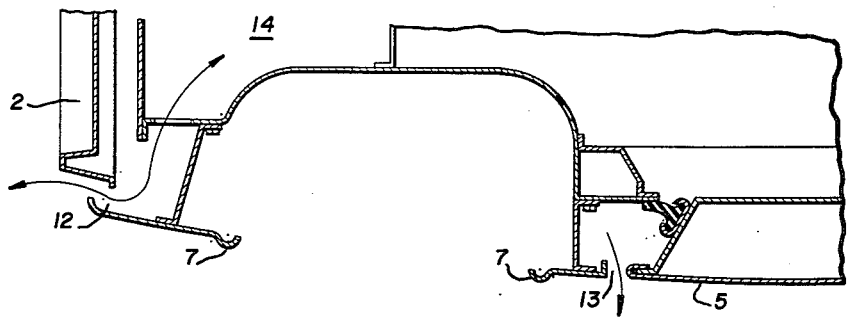
FIGURE 5 is a cross-sectional view, on an enlarged scale, taken along line V—V of FIGURE 1.

Exactly as gaps are provided between the engine hood 3 and the remaining outer body parts or covering panels, gaps 12 and 13 are also formed between the fenders 7 and the end wall 2 as well as between the fender 7 and the door 5, respectively, which are again illustrated in greater detail in FIGURE 5 and are also usable for the air guidance.

The aforementioned gaps 8 through 13 may be used individually or in combination for the supply and discharge of the air necessary for operation of the engine. The gaps normally resulting during assembly from the particular configuration of the body, which, however, are not necessary for guiding air, may be closed off by appropriate sealing means (not shown) in any suitable known manner. This sealing, however, is only necessary to the extent that it is required for purposes of achieving good flow conditions in the engine space 14 with due regard to the aerodynamically conditioned pressure zones and underpressure or suction zones at the vehicle.

While I have shown and described one embodiment in accordance with the present invention, it is understood that the same is not limited thereto but is susceptible of many changes and modifications within the spirit and scope of the present invention. Thus, for example, one or several of the gaps described herein may be used only with any particular vehicle and may be ascribed functions necessary for the particular air guiding system. Additionally, while the vehicle shown in FIGURE 1 may be a vehicle provided with an engine compartment, for example, in front thereof, it is understood that the present invention is not limited thereto but is also applicable with equal effectiveness to motor vehicles having a rear engine in which case the terminal wall 2 of FIGURE 1 would become the rear terminal wall of the vehicle.

Thus, it is quite obvious that the present invention is not limited to the details shown and described herein, but is susceptible of numerous changes within the spirit and scope thereof, and I therefore do not wish to be limited to the details shown and described herein, but intend to cover all such changes and modifications as are encompassed by the scope of the appended claims.

I claim:

1. An air guide system for supplying air to and/or discharging air from a motor vehicle having a plurality of outer body panels and an engine requiring air in the operation thereof, inner wall means defining an engine compartment within said body panels, said body panels including an engine hood extending essentially over the full width of the vehicle and provided with lateral downwardly bent terminal edge portions, said body panels also including fender portions spaced from the terminal edges of the downwardly bent wall portions of said hood to provide gaps therebetween, said fender portions including upwardly extending offset portions spaced inwardly of said downwardly bent wall portions, said offset portions and said downwardly bent wall portions effectively constituting air passageways between said gaps and said engine compartment, said upwardly extending offset portions being positioned to deflect entering air upwardly by approximately 90°, and said wall means defining said engine compartment being open adjacent the top thereof and in communication with said air passageways.

2. An air guide system according to claim 1, wherein said gaps extend substantially the entire length of said fender portions.

3. An air guide system according to claim 1, wherein said outer body panels further include an end wall, and said end wall is spaced from an adjacent fender portion defining an additional gap, and deflection means to deflect air entering at said additional gap by approximately 90° toward said engine compartment.

References Cited in the file of this patent

UNITED STATES PATENTS

| 2,199,316 | Klavik | Apr. 30, 1940 |
| 2,585,220 | Brezek | Feb. 12, 1952 |
| 2,797,952 | Barenyi et al. | July 2, 1957 |

FOREIGN PATENTS

| 935,296 | Germany | Nov. 17, 1955 |